July 21, 1970  A. F. AMELIO  3,521,448
REMOTELY CONTROLLED ROTARY INPUT SIGNAL MEANS FOR INTRODUCING
TRIM CONTROL SIGNAL CORRECTIONS TO JET ENGINE FUEL CONTROLS
Filed Sept. 23, 1968  4 Sheets-Sheet 1
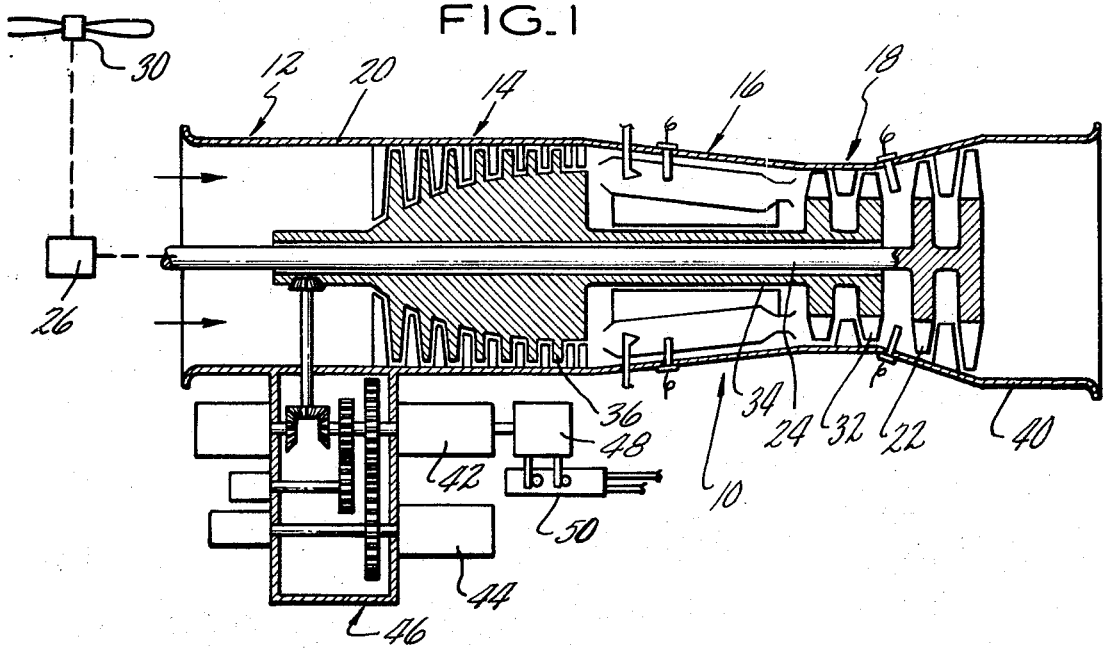
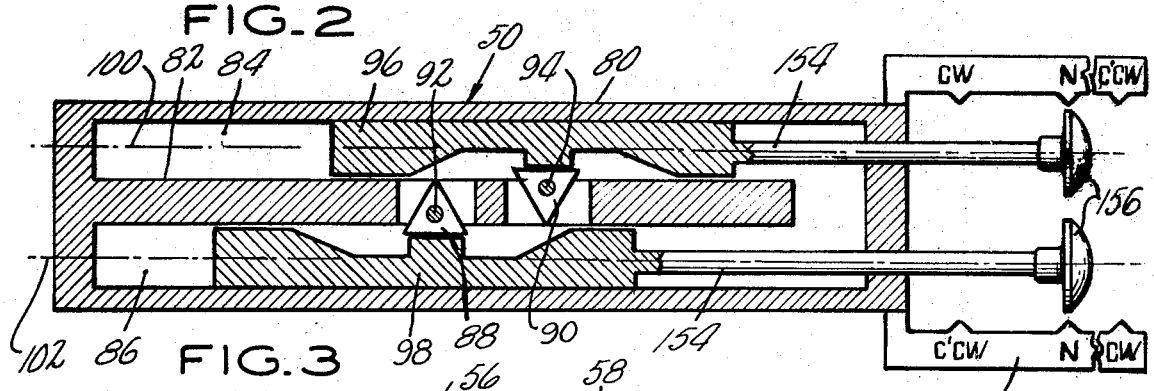
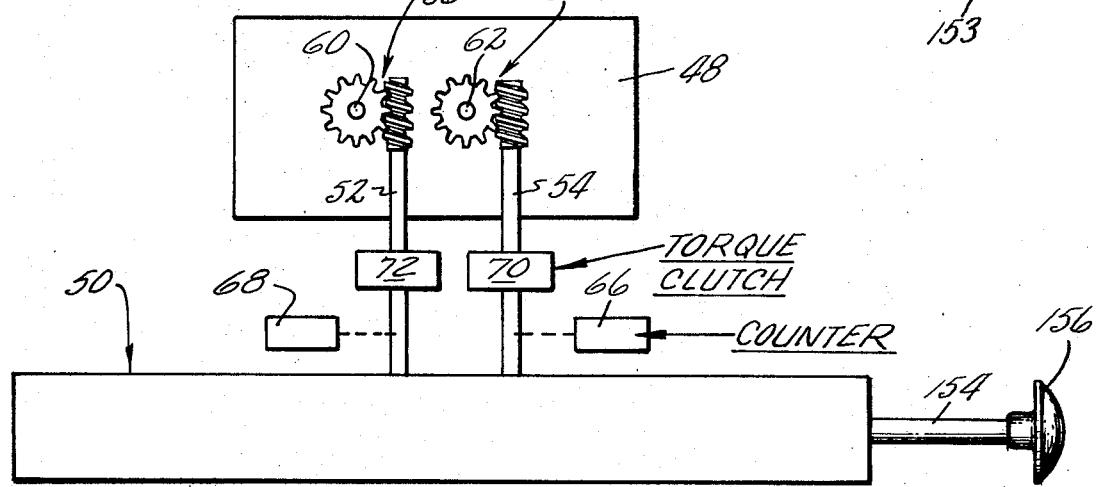
INVENTOR
ARMAND F. AMELIO
BY Vernon F. Hauschild
ATTORNEY

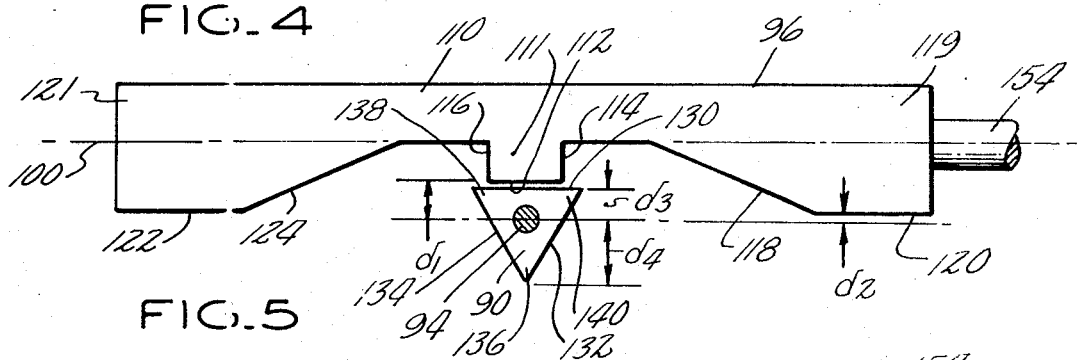

July 21, 1970  A. F. AMELIO  3,521,448
REMOTELY CONTROLLED ROTARY INPUT SIGNAL MEANS FOR INTRODUCING
TRIM CONTROL SIGNAL CORRECTIONS TO JET ENGINE FUEL CONTROLS
Filed Sept. 23, 1968  4 Sheets-Sheet 3

INVENTOR
ARMAND F. AMELIO
BY Vernon F. Hauschild
ATTORNEY

July 21, 1970            A. F. AMELIO            3,521,448
REMOTELY CONTROLLED ROTARY INPUT SIGNAL MEANS FOR INTRODUCING
TRIM CONTROL SIGNAL CORRECTIONS TO JET ENGINE FUEL CONTROLS
Filed Sept. 23, 1968            4 Sheets-Sheet 4
FIG_15
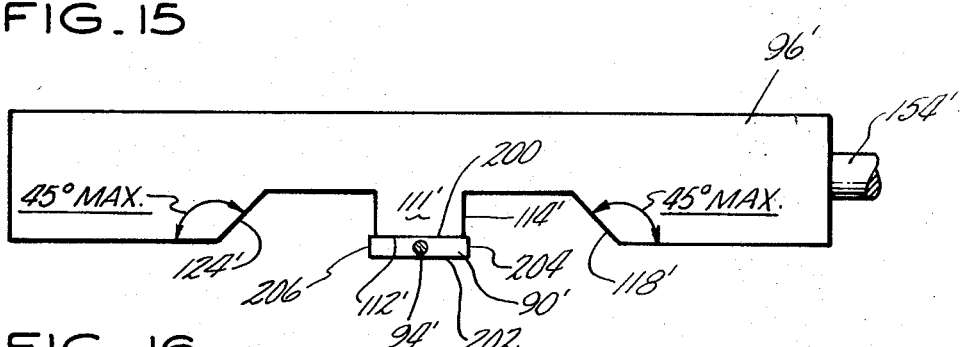
FIG_16
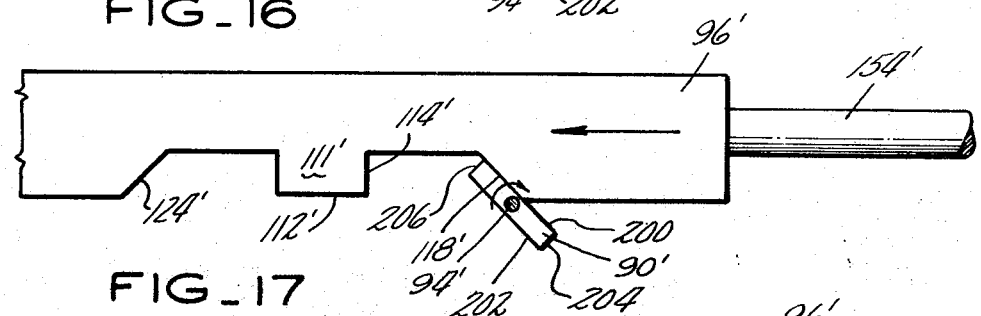
FIG_17
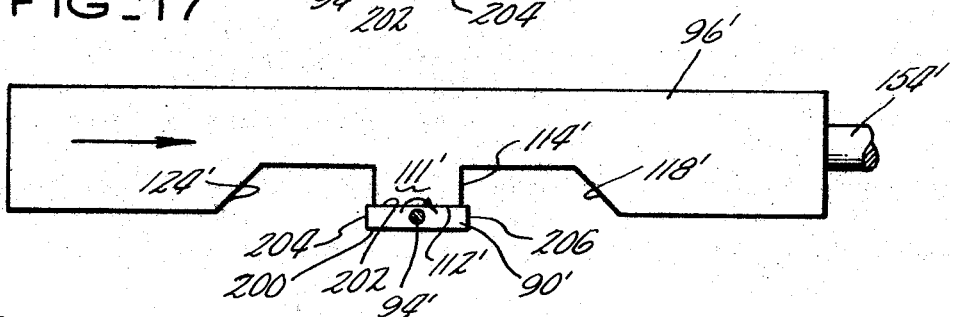
FIG_18
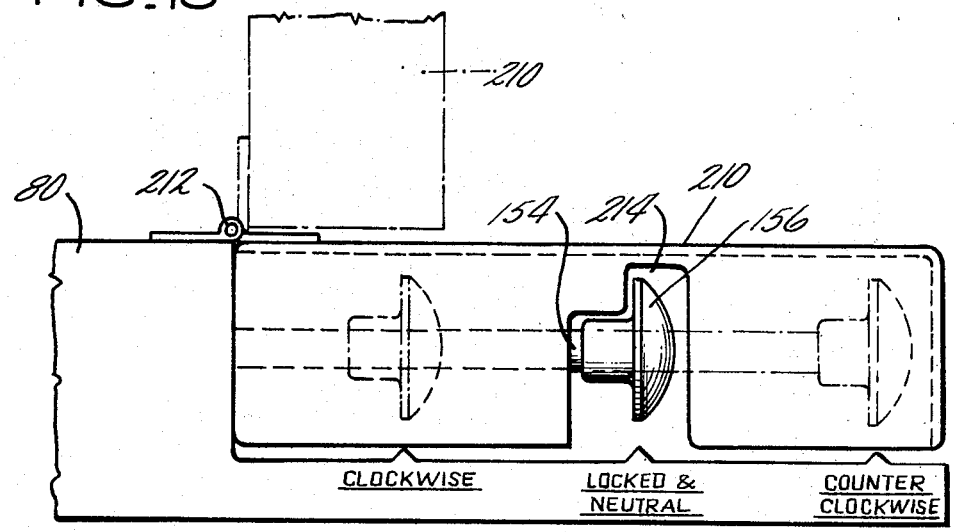
INVENTOR
ARMAND F. AMELIO
BY Vernon F. Hauschild
ATTORNEY

United States Patent Office 3,521,448
Patented July 21, 1970

3,521,448
REMOTELY CONTROLLED ROTARY INPUT SIGNAL MEANS FOR INTRODUCING TRIM CONTROL SIGNAL CORRECTIONS TO JET ENGINE FUEL CONTROLS
Armand F. Amelio, Yonkers, N.Y., assignor to United Aircraft Corporation, East Hartford, Conn., a corporation of Delaware
Filed Sept. 23, 1968, Ser. No. 761,644
Int. Cl. F02c 7/02, 9/04; F02k 3/00
U.S. Cl. 60—39.28        3 Claims

ABSTRACT OF THE DISCLOSURE

A remotely controlled rotary input signal means for introducing trim control signal corrections to jet engine fuel controls comprising a regular polygon mounted for rotation and a selectively contoured cam member translatable in opposite directions with respect to the polygon and contoured so as to lock the polygon in neutral position when centered and so as to cause the polygon, and the shaft attached to the polygon, to rotate two increments in one direction as the cam member is moved leftwardly and then back to center, or to cause the polygon to rotate two increments in the opposite direction as the cam member is translated rightwardly and then back to center.

BACKGROUND OF THE INVENTION

Field of invention

This invention relates to apparatus for introducing from remote locations very accurate rotational inputs into a mechanism and more particularly to remotely introducing rotary trim control signal corrections to the fuel control of an aircraft jet engine by means of a pilot or other crew member operated pull-push lever or button located at a point remote from the fuel control.

Description of the prior art

Many aircraft, such as helicopters, employ turboshaft engines which have both a gas generator turbine and a free power turbine. Both turbines rotate in the same direction but not necessarily at the same speed, since the two turbines are not mechanically coupled to each other. The free power turbine drives the helicopter rotor or aircraft propeller to cause the helicopter rotor to rotate at the desired constant speed. The pilot introduces the desired power turbine speed setting through the engine speed control lever and a governor is provided to establish the gas generator speed at a level necessary to maintain the selected speed of the power turbine so that the helicopter rotor is driven at the desired speed. Since the gas generator speed is primarily dependent upon fuel, and is monitored by the engine fuel control, means for adjusting the engine fuel control must be provided to compensate for varying atmospheric conditions if maximum engine performance is to be attained and maintained. Rotation of an idle trim shaft and a military trim shaft for each engine provide the required control trim capability on the ground and in flight, respectively, so as to produce optimum engine performance. This is known as engine trimming.

In many aircraft and helicopter installations, the engine fuel control is a substantial distance from the pilot and therefore the trim adjustment must be made from a remote location. At the present time, remote trimming capability is provided by the use of a screw-ended flexible cable which connects the trim shaft with the cockpit where trim adjustments are introduced by a screw-driver twist of the cable in the appropriate direction. Such an arrangement has been found to be undesirable since the flexible cable is subject to deflection, windup and hysteresis.

While the flexible cable remote rotary input control system is light in weight and simple in operation, it is not sufficiently accurate an input system for engine trim control.

Unfortunately, any known type of sufficiently accurate system is complicated, heavy and expensive. For example, a series of rigid, torque tubes which are flexibly connected could be used to accomplish this purpose, but such a system would be excessively heavy and mechanically complicated. An electrical drive system, such as selsyn units could be used but any type of electric actuator, some of which would include solenoids, would be expensive and hard to maintain.

A power topping trim adjustment for the engine has to be made while the engine is delivering maximum power because the adjustment varies with atmospheric conditions such as temperature, altitude, etc. This trimming adjustment is made to permit the pilot to obtain maximum power from his engine taking into consideration the operating conditions involved. It is necessary, due to the nature of aircraft jet and turboshaft engines and their fuel controls, that this topping adjustment be a very accurate adjustment and it is desirable that it be capable of being made remotely, preferably by the pilot or other crew member while in flight. If it were not for the pilot remote control capability of the system taught herein, the trimming adjustment would have to be done on a trial and error basis with the adjustment made while on the ground and then testing the engine in flight to determine whether or not the adjustment had been correct.

SUMMARY OF INVENTION

A primary object of the present invention is to provide a mechanism to produce a highly accurate rotary input of selected increment of control and selected direction of rotation and to be operable from a remote location by a translatory motion, preferably a push-pull motion.

In accordance with the present invention, the increment of control, that is, the number of degrees or minutes of rotary input to be produced, will be controlled by a highly accurate gear chain system through which the rotary input is introduced to the control or governor.

In accordance with a further aspect of the present invention, such a highly accurate rotary input can be made by a push-pull motion at a remote location from the control, and wherein the direction of rotation of the input is governed by the direction of translation of the push-pull handle member so that no switch or lever need be thrown or actuated to accomplish change of direction of the rotary input.

In accordance with still a further aspect of the present invention, a topping adjustment for the engine of an aircraft can be made in a highly accurate fashion from a remote location.

In accordance with the present invention, a regular polygon, such as a triangle, is mounted for rotation and a selectively contoured cam member is caused to translate along a straight line axis in spaced relation thereto and this cam member includes an elevated flat surface shaped to abut the sides of the polygon to lock the polygon in a neutral position and further includes elevated angular surfaces on opposite sides and spaced from the flat surface so that as the cam member is translated either leftwardly or rightwardly from the polygon, the polygon will first contact and come into alignment with one of the angular surfaces and, upon return of the cam member to its original centered position, the polygon will be rotated a second increment in the same direction in coming into abutting relation with the flat member again and so that a two increment rotary motion is imparted to the polygon. Had the cam been reciprocated in the opposite direction, the polygon would have been rotated in the opposite direction. Accordingly, the direction of the rotary input signal is determined by the direction in which the push-pull lever is moved and the amount of rotary motion achieved is governed by the number of times the push-pull mechanism is actuated.

It is an important aspect of this invention to teach a control system wherein a very insensitive and sloppy input initiation motion results in a constant and precise, incremental motion output signal.

Other objects and advantages will be apparent from the specification and claims and from the accompanying drawings which illustrate an embodiment of the invention.

BRIEF DESCRIPTION OF THE DRAWINGS

FIG. 1 is a cross-sectional schematic showing of a turboshaft engine driving a helicopter rotor and being controlled by a fuel control which includes the trim adjustment mechanism taught herein.

FIG. 2 is a cross-sectional showing through the remotely controlled rotary input portion of the trim governor.

FIG. 3 shows the reduction gear connection between the rotary input mechanism and the fuel control.

FIGS. 4–12 show the remotely controlled rotary input mechanism in various positions of operation to permit a thorough description thereof.

FIGS. 15–17 illustrate the operation of this invention utilizing a two-lobed polygon.

FIG. 18 is a showing of a lock and cover which is used with this invention.

DESCRIPTION OF THE PREFERRED EMBODIMENT

Figure 9:
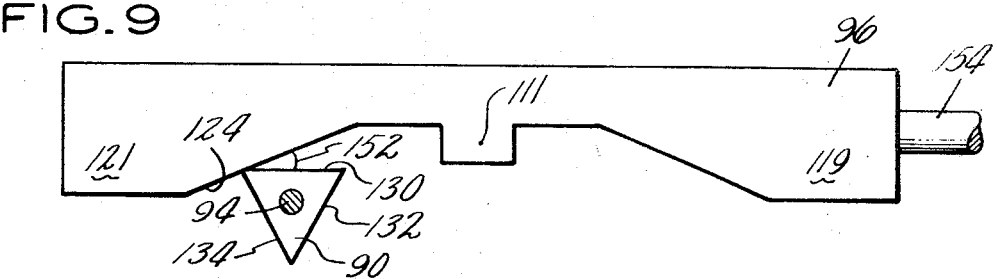

Viewing FIG. 1 we see aircraft turboshaft engine 10 which includes an air inlet section 12, a compressor section 14, a combustion section 16, and a turbine section 18, all of which are positioned in series relation within engine housing 20, which is preferably of circular cross-section. Turbine section 18 includes free power turbine 22 which is connected through shaft 24 and appropriate reduction gearing 26 to helicopter rotor 30 or to an aircraft propeller (not shown). Gas generator turbine 32 is connected through shaft 34 to compressor rotor or gas generator 36 and drives that compressor so as to compress the air entering engine 10 through inlet 12. This compressed air from compressor section 14 is then heated in combustion chamber section 16 and has energy extracted therefrom in passing through turbine section 18 before discharge to atmosphere for jet thrust generation through exhaust outlet 40, which may include a variable area exhaust nozzle, not shown.

Shaft 34 also drives engine fuel pump 42 and engine lube pump 44 through appropriate gearing in accessory section 46. Engine fuel control 48 works through appropriate gearing in accessory section 46 to control the amount of fuel being pumped from fuel pump 42 into engine 10 to thereby govern the speed of turbine sections 32 and 22 and therefore govern the speed of helicopter rotor 30.

The operating characteristics of engine 10 vary with changes in atmospheric condition and from engine-to-engine so that a trim control 50 must be provided to permit the pilot or other crew member to impart trim or topping adjustments to fuel control 48 so as to provide the optimum fuel flow to engine 10 for the various engine operating conditions, and to permit adjustment of this trim control 50 from some remote location. This trim control adjustment must be made while the engine is delivering rated power, usually flight or near flight condition, and therefore remote control thereof is necessary. If the remote control capability did not exist, it would be necessary to guess at the proper trim control, make such adjustment, and flight test the engine to determine whether or not optimum engine performance had been achieved by this adjustment and, if not, land again to readjust on a hit-and-miss basis.

Engine 10 and its relation and connection to helicopter rotor 30 may be as described in U.S. Pat. No. 2,979,968, while fuel control 48 may be of the type described in U.S. Pat. No. 2,822,666.

Viewing FIGS. 2 and 3 we see engine fuel control 48 and its relation and connection to engine topping or trim control 50 in a fashion to be described immediately hereinafter. Output shafts 52 and 54 are caused to rotate by trim governor 50 and to act through highly accurate reduction gear systems 56 and 58 to cause idle trim shaft 60 and military trim shaft 62 to introduce rotary trim corrections into fuel control unit 48.

As best shown in FIG. 3, it may be desirable to place conventional counters 66 and 68 on shafts 54 and 52, respectively, to determine the number of rotary increments which have been imparted to the governor or fuel control 48 from the topping governor 50 and these counters may be of the type sold by the Veeder Root Company of Hartford, Conn. In practice, the pilot might find it desirable to merely actuate the topping device until the engine r.p.m., as indicated by the engine output gage, shows the correct output for a given load.

In addition, to insure that excessive rotary motion in one direction is not imparted to fuel control 48, torque clutches 70 and 72 may be placed in shafting 54 and 52, respectively, so that inputs from topping governor 50 to fuel control 48 do not occur when the torque for transmission thereof exceeds a preselected amount, which is an indication that the end of travel has been reached in the fuel control system.

Now referring to FIG. 2 we see a trim input mechanism or control 50 contained within housing 80 which is divided by a central partition 82 which divides housing 80 into first and second compartments 84 and 86. Regular polygon shaped members, such as equilateral triangle members 88 and 90, are mounted on partition 82 for rotation about pivot pins or axes 92 and 94, respectively. Selectively contoured cam members 96 and 98 are mounted for translation and reciprocation within longitudinal chambers 84 and 86, respectively, and translate along straight line axes 100 and 102 which are spaced from rotational axes 92 and 94 of polygon members 88 and 90. Input cam member 96 and its coacting regular polygon member 90 will be described in full particularity and it should be borne in mind that input cam member 98 and its coacting regular polygon member 88 are identical therewith and that while regular polygon member 90 drives output shaft 54 and hence military trim shaft 62 through reduction gear system 58 output polygon 88 drives idle trim shaft 60 through output shaft 52 and reduction gear system 56.

Input member 96 and output member 90 are shown in greater particularity in FIG. 4. Translatable and reciprocatable input member 96 is a contoured cam member which includes a main body portion 110 with an elevated portion 111 projecting therefrom and having a flat surface 112 extending substantially parallel to the axis of translation 100 thereof, and spaced a selective distance $d_1$ from polygon axis 94 and including side surfaces 114 and 116, which are substantially perpendicular to the flat surface 112. Spaced to the right along axis 100 from elevated flat surface 112 is elevated angular portion 119, which includes flat surface 120, which projects closer to axis 94 than flat surface 112 so as to be spaced distance $d_2$ therefrom when in alignment therewith, so that elevated angular portion 119 and elevated angular surface 118 project farther from main body 110 of selective input cam member 96 than does flat surface 112. It should be noted that angular surface 118 forms an acute angle with the surface of polygon 90 which is in alignment with surface 112, so as to selectively control the rotation of polygon member 90 in the desired direction when contact is made therebetween. Cam member 96 also includes a second elevated angular portion 121 spaced along axis 100 on the opposite side of central elevated portion 111 thereof from the first elevated angular portion 120 thereof. Flat surface 122 of portion 121 is preferably in alignment with flat surface 120 of portion 119. Angular surface 124 of elevated portion 121 is at an opposed angle to angular surface 118 of elevated portion 119 and preferably forms substantially the same acute angle with respect to flat surface 112 as does surface 118 so as to selectively control the direction of rotation of polygon member 90 when the polygon member comes in contact therewith.

While not necessarily so limited, regular polygon member 90 is shown and will be described as an equilateral triangle with equal side faces 130, 132, and 134 defining equal included or vertex angles 136, 138 and 140 therebetween. The distance measured by the perpendicular from axis 94, which is at the geometric center or centroid of polygon 90, to any of the sides of member 90 is distance $d_3$ and it will be noted that distance $d_3$ is substantially the same as distance $d_1$ so that when flat surface 112 of cam member 96 is in abutting relation with an of the sides 130–134 of polygon member 90, the polygon member is locked in a neutral position. It will also be noted that distance $d_4$ between axis 94 and the vortex of any of the included angles 136–140 is a greater distance than distances $d_1$ and $d_3$. This relationship is necessary to insure, that as described hereinafter, polygon 90 will be intercepted by the side surfaces 114 and 116 of cam portion 110 whenever polygon 90 is out of orientation with its FIG. 4 neutral position and cam member 96 translates thereby.

The operation and coaction between cam member 96 and polygon 90 will now be described to illustrate how by a push-pull, reciprocal motion of cam member 96, polygon member 90 can be caused to rotate incrementally and selectively in either direction and FIGS. 4–12 will be described in this connection. As previously stated, in the position shown in FIG. 4, polygon 90 is locked in position since side surface 130 thereof is abutting surface 112 of cam member 96. Accordingly, with polygon 90 in this position, no trim input is being or can be imparted to fuel control 48 because the polygon is locked in position. If the pilot should want to introduce a clockwise rotary input into fuel control 48 through trim governor 50, he would first push link member or system 154 which, as best shown in FIG. 2, is connected to cam member 96 so as to cause the cam member to translate along axis 100. Link member 154 includes a button-type handle 156 for the pilot to grip and extends remotely from control 50 any desired distance. As best shown in FIG. 5, this push motion of link 154 causes cam member 96 to translate to the left and brings camming surface 118 into contact with included or vertex angle 140 of polygon 90, which is still oriented in its FIG. 4 position. In view of the fact that an acute angle 150 is formed between camming surface 118 and polygon side 130 (which is parallel to flat surface 112), polygon 90 will be caused to rotate in a clockwise direction by the further leftward movement of cam member 96 until, as best shown in FIG. 6, side surface 130 of polygon 90 contacts camming surface 118 whereupon polygon 90 is in a first oriented position having rotated a first increment in a clockwise direction from its original FIG. 4 position. As more fully explained hereinafter, angle 150 should be less than 180° divided by the number of sides of polygon 90.

With polygon 90 in its FIG. 6 position, camming surface 118 serves to lock polygon 90 in position. If the pilot wishes to cause polygon 90 to rotate in the same clockwise direction a second increment, he will then pull upon rod 154 to cause cam member 96 to move rightwardly until eventually, as best shown in FIG. 7, and with polygon 90 still oriented in its FIG. 6 position surface 134 of polygon 90 contacts side surface 114 of raised portion 111 so that further rightward motion of member 96 will cause polygon 90 to rotate in a clockwise direction a second increment of rotation until surface 134 thereof is in abutting relation with flat surface 112, as best shown in FIG. 8, so that polygon 90 is now in a newly oriented position and locked in position by flat surface 112, having rotated two increments in a clockwise direction.

Figure 10:
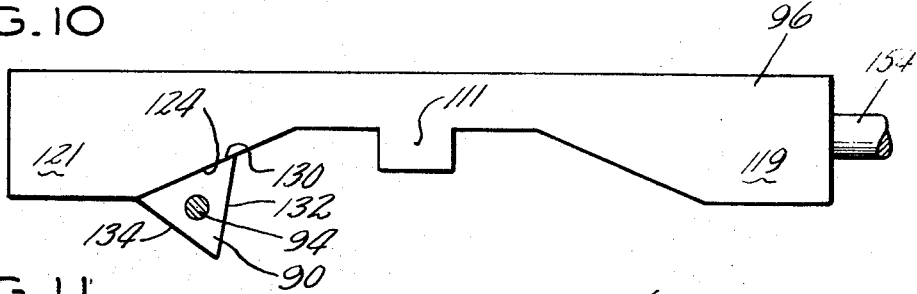
Figure 11:
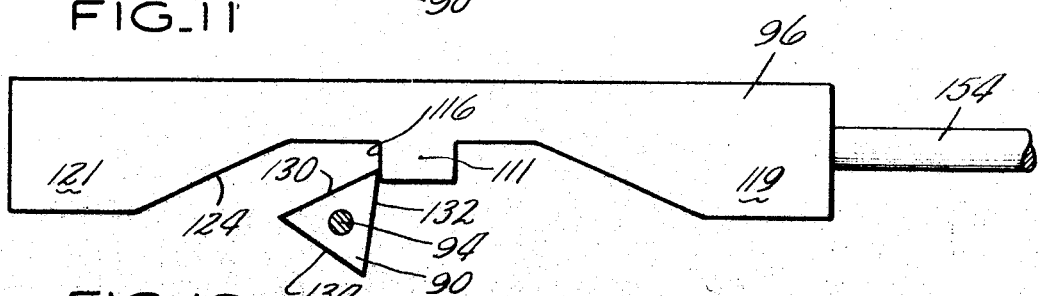
Figure 12:
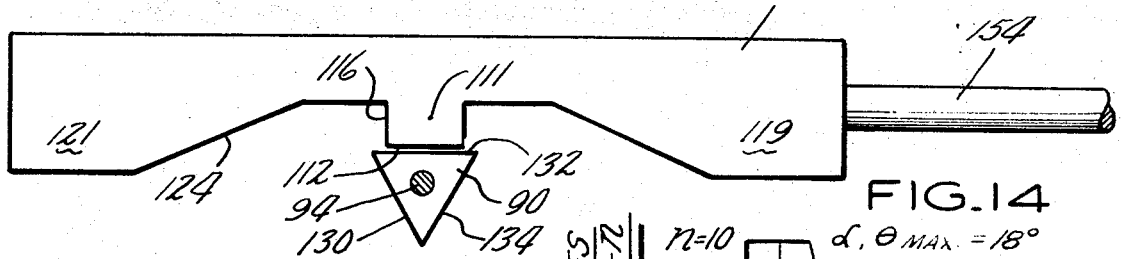

If when polygon was in its original FIG. 4 neutral position the pilot had wanted to introduce one or two counterclockwise input trimming motions to the fuel control 48, he would have first utilized button 156 to pull link 154 and hence cam member 96 rightwardly until, as best shown in FIG. 9, and with polygon 90 still oriented in its FIG. 4 position, polygon 90 contacts elevated, angular, camming surface 124, and due to the acute angle 152 formed between camming surface 124 and polygon surface 130, further rightward movement of cam member 96 will cause polygon member 90 to rotate a first increment in a counterclockwise direction until it reaches the oriented position shown in FIG. 10 wherein surface 130 abuts camming surface 124. In the FIG. 10 position, polygon 90 is locked in position by camming surface 124. If the pilot wants the polygon 90 to rotate a second controlled increment in a counterclockwise direction, he pushes button 156 of link 154 to cause camming member 96 to move in a leftward direction until, as best shown in FIG. 11, and with polygon 90 still oriented in its FIG. 10 position, surface 132 thereof contacts side surface 116 of cam member 96 so that further leftward motion of cam member 96 will cause polygon 90 to rotate a second increment in a counterclockwise direction until side 132 of polygon 90 abuts flat surface 112 of cam member 96 as shown in FIG. 12.

It will accordingly be seen that the pilot was able to remotely cause polygon 90 to take two incremental turns of clockwise direction by first pushing and then pulling link system 154 to cause the polygon 90 to first rotate to the first oriented position shown in FIG. 6 and then rotate in the same clockwise direction to the second oriented position shown in FIG. 8. If the pilot had wanted to impart a counterclockwise correction to the fuel control 48, he would have first pulled link system 154 to first rotate polygon 90 a first increment in a counterclockwise direction to its third oriented position shown in FIG. 10 and then pulled link system 154 to rotate polygon 90 a second increment in a counterclockwise direction to assume its fourth oriented position shown in FIG. 12.

It will be appreciated that if the pilot had imparted a pull-push motion to link 154 with polygon 90 in its FIG. 8 position, polygon 90 would return to its FIG. 4 position.

It will further accordingly be seen that the pilot can determine what direction of rotary input correction he is going to make to control 48 by controlling the direction in which he translates cam member 96 through link system 154 and he can control the total amount of rotary input to control 48 by the number of times he goes through the push-pull or pull-push input motion in the selected direction.

As best shown in FIG. 2, it is preferable to place some sort of a noting system such as 153 adjacent button 156, link systems 154 to indicate what direction of motion is going to produce a counterclockwise rotation and what direction of motion is going to produce a clockwise rotation. As shown in FIG. 2, starting from a FIG. 4 neutral position, a push-pull motion to link system 154 produces a two-increment clockwise rotation to output polygon 90, while a pull-push motion to link system 154 will produce a two increment counterclockwise rotation to output polygon 90.

It will be noted that if the first and second increments of rotation of polygon 90 are to be substantially equal for each push-pull or pull-push motion of link system 154 when polygon 90 is an equilateral triangle, that cam surfaces 120 and 124 should form an angle of 60° with surface 112 or cam axis 100. Further, the total amount of rotation generated by a push-pull or pull-push motion of link system 154 will be 360° ÷N, wherein is the number of sides of the polygon.

As embodied in the invention, the term regular polygon should not be interpreted in its strictest geometric sense but should be inclusive of any rotatable member which incorporates two or more points or lobes equidistant from that member's geometric center and which can coact with at least one camming member to provide incremental rotation of the rotatable member about an axis of rotation which coincides with its geometric center. Nevertheless, showing the rotatable member as a regular polygon makes it possible to illustrate a generalized relationship inherent in the regular polygon/camming member arrangement already described in detail.

Figure 13:
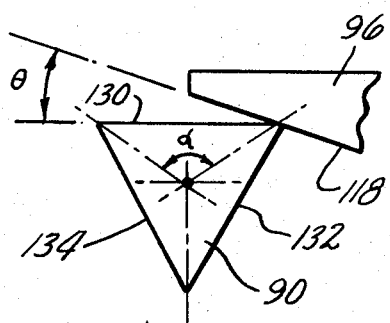
FIG. 13 shows the geometry of the cam and polygon members in greater particularity to illustrate the angle of incidence between the translating cam member and the rotating output member.

Referring to FIG. 13 camming surface 118 is depicted at the instant of initial contact with regular polygon 90 shown in its centered or neutral position. As shown, further translation of camming member 96 from right to left tends to rotate regular polygon 90 clockwise until surface 130 aligns itself with surface 118 to complete the first portion of the input motion already described. It can be shown that the angle of incidence $\theta$ between surfaces 118 and 130 at the instant of initial center must fall within a range whose lower limit is in all cases equal to 0° and whose upper limit is dependent upon the number of sides $n$ of the polygon employed as defined by the expression $\theta_{max}=180°/n$.

Figure 14:
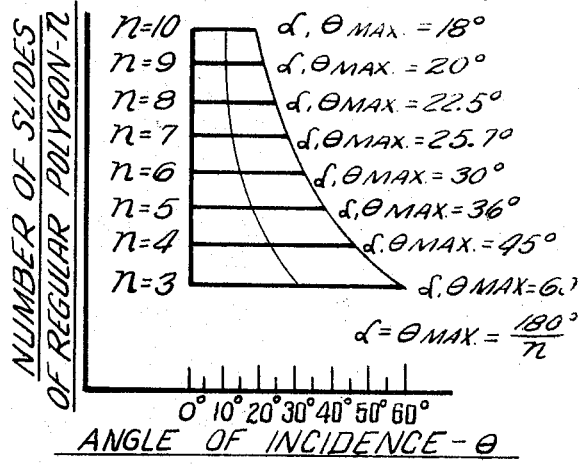
FIG. 14 graphically illustrates the range of this angle of incidence as the number of sides of the regular polygon changes.

Referring to FIG. 14 the above-stated relationship can be shown graphically. As shown an equilateral triangle, or its equivalent polygon, where $n=3$ has a range of $\theta$ equal to 0°–60°, with the range approaching zero asymptotically as in $n$ approaches infinity.

Thus, selecting a total increment of rotation through which the regular polygon is to be rotated by a complete push-pull motion determines the value of $n$ whereupon $\theta$ is selected from the available range.

It should be apparent from FIGS. 13 and 14 that for all values of $n$ the proposed system is wholly inoperative when $\theta=0$ since surfaces 118 and 130 are then parallel to one another, and exhibit only a 50% chance of operating in the desired direction when $\theta=\theta_{max}$ since surface 118 is then disposed symmetrically with respect to surfaces 130 and 132. Moreover, if the sides of the regular polygon employed together define sharp vertices as depicted in FIG. 13 there is a tendency for the intersection of surfaces 130 and 132 to penetrate surface 118 rather than slide as desired. Thus out of practical considerations it is desirable that $\theta$ assume a value somewhat less than $\theta_{max}$ but greater than 0° and that the vertices be somewhat rounded in shape.

While the regional polygon member have been illustrated as an equilateral triangle in FIGS. 2–12, as stated above the rotary members could well be of different shape. To illustrate the operation of a two-lobed polygon reference is hereby made to FIGS. 15, 16 and 17. Referring to FIG. 15 we see reciprocal cam member 96' to be substantially of the shape of the corresponding element described in connection with FIGS. 2–12 but it will be noted that polygon 90' is a two-lobed member mounted to be pivotable about axis 94' and including one side surface 200, which is shown in FIG. 15 in abutting relation with flat surface 112', a second side surface 202 and end surface 204 and 206.

Cam member 96' is shown in its neutral position in FIG. 15 wherein it locks regular polygon 90' in position with surface 200 and 112' abutting. If the pilot wants to cause two incremental clockwise rotations to polygon 90', he should first push cam member 96' leftwardly until surface 118' contacted the included angle between end surface 204 and side surface 200 of polygon 90' so that further leftward motion of cam member 96' would cause polygon 90' to rotate in a clockwise direction a first increment to its FIG. 16 position wherein surface 200 and 118' abut. To cause polygon 90' to rotate a second increment in a clockwise direction, the pilot would then move cam member 96' rightwardly, with polygon 90' remaining oriented in its FIG. 16 position, until the included angle between surface 206 and 202 of polygon 90' abuts side surface 114' of cam member 96' and so that further rightward motion of cam member 96' will cause polygon 90' to rotate a second increment in a clockwise direction to its FIG. 17 position wherein surface 202 and 112' abut.

It will be obvious that if the pilot desired to introduce two counterclockwise, incremental motions into polygon 90', he would first have to move cam member 96' rightwardly and then leftwardly.

As best shown in FIG. 18 it might be desirable to pivotally attach a cover and lock 210 to trim control housing 80 at pivot connection 212. Cover and lock includes detent 214, which is shaped to receive knob 156 of linkage system 154 and which cover can only be closed when knob 156 is in its neutral position wherein detent 214 of cover 210 serves to lock linkage system 154 in this neutral position, as in FIG. 4.

I wish it to be understood that I do not desire to be limited to the exact details of construction shown and described for obvious modificatons will occur to a person skilled in the art.

I claim:

1. A trim control adapted to impart remote pilot inputs into an engine fuel control for engine topping purposes including:
   (1) a manually operated military trim control connected to control said fuel control and adapted to convert a translatory push-pull input into a two increment rotary output and including:
      (a) a regular polygon member including first, second and third adjacent sides defining first and second included angles therebetween,
      (b) means mounting said polygon member for rotation about an axis so that a first distance is established by a perpendicular between said axis and said sides and so that a second distance greater than said first distance is established between said axis and the apex of said included angles,
      (c) a cam member spaced from said axis and mounted for translation with respect to said polygon member along a straight line axis offset therefrom and including:
         (1) a first portion defining an elevated flat surface parallel to said cam axis and with first and second side surfaces on opposite sides thereof wherein said flat surface is spaced from said axis substantially said first distance when in alignment therewith so that said cam flat surface and one of said polygon sides abut to lock said polygon member in a neutral position and,
         (2) a second portion defining a first elevated angular surface wherein said first angular surface is in spaced relation to said flat surface along the direction of translation thereof and forming an acute angle therewith which is less than 180° divided by the number of sides of the polygon and projecting closer to said axis when in alignment therewith than said flat surface so that when said cam member is translated in a first direction from said neutral position wherein said flat surface and said first side of said polygon member are in abutting relation, said first included angle of said polygon member will contact said first angular surface and cause said polygon member to rotate a first increment in a first direction until said polygon member first side is in abutting relation with said first angular surface of said cam member, thereby placing said polygon member in a first oriented position and further so that as said cam member is then translated in a second direction opposite to said first direction the second included angle of said polygon member will contact said first side surface of said first portion and cause said polygon member to rotate a second increment in said first direction as said cam member translates further to cause said second side of said polygon member to come into abutting alignment with said flat surface so that said polygon member is in a second orientated position and again locked in a neutral position, (3) a third portion defining a second elevated angular surface wherein said second angular surface is in spaced relation to said flat surface along the direction of translation thereof and on the opposite side thereof from said first angular surface and forming an acute angle therewith which is less than 180° divided by the number of sides of the polygon and projecting closer to said axis when in alignment therewith than said flat surface so that when said cam member is translated in said second direction from said neutral position wherein said flat surface and said first side of said polygon member are in abutting relation, said second included angle of said polygon member will contact said second angular surface and cause said polygon member to rotate a first increment in a second direction opposite to said first direction of rotation until said polygon member first side is in abutting relation with said second angular surface of said cam member thereby placing said polygon member in a third oriented position, and further so that as said cam member is then translated in said second direction, said first included angle of said polygon member will contact said second side surface of said first portion and cause said polygon member to rotate a second increment in said second direction as said cam member translates further to cause said third side of said polygon member to come into abutting alignment with said flat surface so that said polygon member is in a fourth oriented position and again locked in a neutral position, (d) means remote from and connected to said cam member to cause said cam member to translate in said first and second directions, (2) a manually operated idle trim control connected to control said fuel control and adapted to convert a translatory push-pull input into a two increment rotary output and including:

(a) a regular polygon member including first, second and third adjacent sides defining and second included angles therebetween, (b) means mounting said polygon member for rotation about an axis so that a first distance is established by a perpendicular between said axis and said sides and so that a second distance greater than said first distance is established between said axis and the apex of said included angles, (c) a cam member spaced from said axis and mounted for translation with respect to said polygon member along a straight line axis offset therefrom and including:

(1) a first portion defining an elevated flat surface parallel to said cam axis and with first and second side surfaces on opposite sides thereof wherein said flat surface is spaced said axis substantially said first distance when in alignment therewith so that said cam flat surface and one of said polygon sides abut to lock said polygon member in a neutral position and, (2) a second portion defining a first elevated angular surface wherein said first angular surface is in spaced relation to said flat surface along the direction of translation thereof and forming an acute angle therewith which is less than 180° divided by the number of sides of the polygon and projecting closer to said axis when in alignment therewith than said flat surface so that when said cam member is translated in a first direction from said neutral position wherein said flat surface and said first side of said polygon member are in abutting relation, said first included angle of said polygon member will contact said first angular surface and cause said polygon member to rotate a first increment in a first direction until said polygon member first side is in abutting relation with said first angular surface of said cam member thereby placing said polygon member in a first oriented position, and further so that as said cam member is then translated in a second direction opposite to said first direction the second included angle of said polygon member will contact said first side surface of said first portion and cause said polygon member to rotate a second increment in said first direction as said cam member translates further to cause said second side of said polygon member to come into abutting alignment with said flat surface so that said polygon member is in a second oriented position and again locked in a neutral position, (3) a third portion defining a second elevated angular surface wherein said second angular surface is in spaced relation to said flat surface along the direction of translation thereof and on the opposite side thereof from said first angular surface and forming an acute angle therewith which is less than 180° divided by the number of sides of the polygon and projecting closer to said axis when in alignment therewith than said flat surface so that when said cam member is translated in said second direction from said neutral position wherein said flat surface and said first side of said polygon member are in abutting relation, said second included angle of said polygon member will contact said second angular surface and cause said polygon member to rotate a first increment in a second direction opposite to said first direction of rotation until said polygon member first side is in abutting relation with said second angular surface of said cam member thereby placing said polygon member in a third oriented position, and further so that as said cam member is then translated in said second direction, said first included angle of said polygon member will contact said second side surface of said first portion and cause said polygon member to rotate a second increment in said second direction as said cam member translates further to cause said third side of said polygon member to come into abutting alignment with said flat surface so that said polygon member is in a fourth oriented position and again locked in a neutral position,
 (d) means remote from and connected to said cam member to cause said cam member to translate in said first and second directions.
2. A turbine-type engine including:
 (1) an engine case having:
  (b) and outlet end,
  (a) an inlet end and,
 (2) a compressor section located within said engine case,
 (3) a turbine section located within said engine case and spaced downstream from said compressor section and connected thereto to drive said compressor section,
 (4) a combustion section located within said engine case between said compressor and turbine sections so that air which enters said inlet is compressed in passing through said compressor section, is heated in passing through said combustion section and has energy extracted therefrom in passing through said turbine section for driving said compressor section before being discharged through said outlet,
 (5) a fuel pump connected to provide fuel to said combustion section for burning therein,
 (6) an engine fuel control connected to said fuel pump so as to control fuel output thereof and hence the power developed by said engine,
 (7) a manually operated military trim control connected to control said fuel control and adapted to convert a translatory push-pull input into a two increment rotary output and including:
  (a) a regular polygon member including first, second and third adjacent sides defining first and second included angles therebetween,
  (b) means mounting said polygon member for rotation about an axis so that a first distance is established by a perpendicular between said axis and said sides and so that a second distance greater than said first distance is established between said axis and the apex of said included angles,
  (c) a cam member spaced from said axis and mounted for translation with respect to said polygon member along a straight line axis offset therefrom and including:
   (1) a first portion defining an elevated flat surface parallel to said cam axis and with first and second side surfaces on opposite sides thereof wherein said flat surface is spaced from said axis substantially said first distance when in alignment therewith so that said cam flat surface and one of said polygon sides abut to lock said polygon member in a neutral position and,
   (2) a second portion defining a first elevated angular surface wherein said first angular surface is in spaced relation to said flat surface along the direction of translation thereof and forming an acute angle therewith which is less than 180° divided by the number of sides of the polygon and projecting closer to said axis when in alignment therewith than said flat surface so that when said cam member is translated in a first direction from said neutral position wherein said flat surface and said first side of said polygon member are in abutting relation, said first included angle of said polygon member will contact said first angular surface and cause said polygon member to rotate a first increment in a first direction until said polygon member first side is in abutting relation with said first angular surface of said cam member, thereby placing said polygon member in a first oriented position and further so that as said cam member is then translated in a second direction opposite to said first direction the second included angle of said polygon member will contact said first side surface of said first portion and cause said polygon member to rotate a second increment in said first direction as said cam member translates further to cause said second side of said polygon member to come into abutting alignment with said flat surface so that said polygon member is in a second oriented position and again locked in a neutral position,
   (3) a third portion defining a second elevated angular surface wherein said second angular surface is in spaced relation to said flat surface along the direction of translation thereof and on the opposite side thereof from said first angular surface and forming an acute angle therewith which is less than 180° divided by the number of sides of the polygon and projecting closer to said axis when in alignment therewith then said flat surface so that when said cam member is translated in said second direction from said neutral position wherein said flat surface and said first side of said polygon member are in abutting relation, said second included angle of said polygon member will contact said second angular surface and cause said polygon member to rotate a first increment in a second direction opposite to said first direction of rotation until said polygon member first side is in abutting relation with said second angular surface of said cam member thereby placing said polygon member in a third oriented position, and further so that as said cam member is then translated in said second direction, said first included angle of said polygon member will contact said second side surface of said surface of said first portion and cause said polygon member to rotate a second increment in said second direction as said cam member translates further to cause said third side of said polygon member to come into abutting alignment with said flat surface so that said polygon member is in a fourth oriented position and again locked in a neutral position,
  (d) means remote from and connected to said cam member to cause said cam member to translate in said first and second directions,
 (8) a manually operated idle trim control connected to control said fuel control and adapted to convert a translatory push-pull input into a two increment rotary output and including:
  (a) a regular polygon member including first, second and third adjacent sides defining first and second included angles therebetween, (b) means mounting said polygon member for rotation about an axis so that a first distance is established by a perpendicular between said axis and said sides and so that a second distance greater than said first distance is established between said axis and the apex of said included angles, (c) a cam member spaced from said axis and mounted for translation with respect to said polygon member along a straight line axis offset therefrom and including:

(1) a first portion defining an elevated flat surface parallel to said cam axis and with first and second side surfaces on opposite sides thereof wherein said flat surface is spaced from said axis substantially said first distance when in alignment therewith so that said cam flat surface and one of said polygon sides abut to lock said polygon member in a neutral position and, (2) a second portion defining a first elevated angular surface wherein said first angular surface is in spaced relation to said flat surface along the direction of translation thereof and forming an acute angle therewith which is less than 180° divided by the number of sides of the polygon and projecting closer to said axis when in alignment therewith than said flat surface so that when said cam member is translated in a first direction from said neutral position wherein said flat surface and said first side of said polygon member are in abutting relation, said first included angle of said polygon member will contact said first angular surface and cause said polygon member to rotate a first increment in a first direction until said polygon member first side is in abutting relation with said first angular surface of said cam member thereby placing said polygon member in a first oriented position, and further so that as said cam member is then translated in a second direction opposite to said first direction the second included angle of said polygon member will contact said first side surface of said first portion and cause said polygon member to rotate a second increment in said first direction as said cam member translates further to cause said second side of said polygon member to come onto abutting alignment with said flat surface so that said polygon member is in a second oriented position and again locked in a neutral position, (3) a third portion defining a second elevated angular surface wherein said second angular surface is in spaced relation to said flat surface along the direction of translation thereof and on the opposite side thereof from said first angular surface and forming an acute angle therewith which is less than 180° divided by the number of sides of the polygon and projecting closer to said axis when in alignment therewith than said flat surface so that when said cam member is translated in said second direction from said neutral position wherein said flat surface and said first side of said polygon member are in abutting relation, said second included angle of said polygon member will contact said second angular surface and cause said polygon member to rotate a first increment in a second direction opposite to said first direction of rotation until said polygon member first side is in abutting relation with said second angular surface of said cam member thereby placing said polygon member in a third oriented position, and further so that as said cam member is then translated in said second direction, said first included angle of said polygon member will contact said second side surface of said first portion and cause said polygon member to rotate a second increment in said second direction as said cam member translates further to cause said third side of said polygon member to come into abutting alignment with said flat surface so that said polygon member is in a fourth oriented position and again locked in a neutral position, (d) means remote from and connected to said cam member to cause said cam member to translate in said first and second directions.

3. A manually operated trim control adapted to be used with the fuel control of a turbine-type engine including:

(1) a remotely manually controlled military trim adjustment adapted to impart accurate rotary input to the fuel control as a result of manual push-pull translatory motion including:

(a) a regular polygon member including first, second and third adjacent sides defining first and second included angles therebetween, (b) means mounting said polygon member for rotation about an axis so that a first distance is established by a perpendicular between said axis and said sides and so that a second distance greater than said first distance is established between said axis and the apex of said included angles, (c) a cam member spaced from said axis and mounted for translation with respect to said polygon member along a straight line axis offset therefrom and including:

(1) a first portion defining an elevated flat surface parallel to said cam axis and with first and second side surfaces on opposite sides thereof wherein said flat surface is spaced from said axis substantially said first distance when in alignment therewith so that said cam flat surface and one of said polygon sides abut to lock said polygon member in a neutral position and, (2) a second portion defining a first elevated angular surface wherein said first angular surface is in spaced relation to said flat surface along the direction of translation thereof and forming an acute angle therewith which is less than 180° divided by the number of sides of the polygon and projecting closer to said axis when in alignment therewith than said flat surface so that when said cam member is translated in a first direction from said neutral position wherein said flat surface and said first side of said polygon member are in abutting relation, said first included angle of said polygon member will contact said first angular surface and cause said polygon member to rotate a first increment in a first direction until said polygon member first side is in abutting relation with said first angular surface of said cam member, thereby placing said polygon member in a first oriented position and further so that as said cam member is then translated in a second direction opposite to said first direction the second included angle of said polygon member will contact said first side surface of said first portion and cause said polygon member to rotate a second increment in said first direction as said cam member translates further to cause said second side of said polygon member to come into abutting alignment with said flat surface so that said polygon member is in a second oriented position and again locked in a neutral position, (3) a third portion defining a second elevated angular surface wherein said second angular surface is in spaced relation to said flat surface along the direction of translation thereof and on the opposite side thereof from said first angular surface and forming an acute angle therewith which is less than 180° divided by the number of sides of the polygon and projecting closer to said axis when in alignment therewith then said flat surface so that when said cam member is translated in said second direction from said neutral position wherein said flat surface and said first side of said polygon member are in abutting relation, said second included angle of said polygon member will contact said second angular surface and cause said polygon member to rotate a first increment in a second direction opposite to said first direction of rotation until said polygon member first side is in abutting relation with said second angular surface of said cam member thereby placing said polygon member in a third oriented position, and further so that as said cam member is then translated in said second direction, said first included angle of said polygon member will contact said second side surface of said first portion and cause said polygon member to rotate a second increment in said second direction as said cam member translates further to cause said third side of said polygon member to come into abutting alignment with said flat surface so that said polygon member is in a fourth oriented position and again locked in a neutral position, (d) means remote from and connected to said cam member to cause said cam member to translate in said first and second directions, (2) a remotely manually controlled idle trim adjustment adapted to impart accurate rotary input motions to the fuel control as a result of push-pull translatory motions including:

(a) a regular polygon member including first, second and third adjacent sides defining first and second included angles therebetween, (b) means mounting said polygon member for rotation about an axis so that a first distance is established by a perpendicular between said axis and said sides and so that a second distance greater than said first distance is established between said axis and the apex of said included angles, (c) a cam member spaced from said axis and mounted for translation with respect to said polygon member along a straight line axis offset therefrom and including:

(1) a first portion defining an elevated flat surface with parallel to said cam axis and first and second side surfaces on opposite sides thereof wherein said flat surface is spaced from said axis substantially said first distance when in alignment therewith so that said cam flat surface and one of said polygon sides abut to lock said polygon member in a neutral position and, (2) a second portion defining a first elevated angular surface wherein said first angular surface is in spaced relation to said flat surface along the direction of translation thereof and forming an acute angle therewith which is less than 180° divided by the number of sides of the polygon and projecting closer to said axis when in alignment therewith than said flat surface so that when said cam member is translated in a first direction from said neutral position wherein said flat surface and said first side of said polygon member are in abutting relation, said first included angle of said polygon member will contact said first angular surface and cause said polygon member to rotate a first increment in a first direction until said polygon member first side is in abutting relation with said first angular surface of said cam member thereby placing said polygon member in a first oriented position, and further so that as said cam member is then translated in a second direction opposite to said first direction the second included angle of said polygon member will contact said first side surface of said first portion and cause said polygon member to rotate a second increment in said first direction as said cam member translates further to cause said second side of said polygon member to come into abutting alignment with said flat surface so that said polygon member is in a second oriented position and again locked in a neutral position, (3) a third portion defining a second elevated angular surface wherein said second angular surface is in spaced relation to said flat surface along the direction of translation thereof and on the opposite side thereof from said first angular surface forming an acute angle therewith which is less than 180° divided by the number of sides of the polygon and projecting closer to said axis when in alignment therewith than said flat surface so that when said cam member is translated in said second direction from said neutral position wherein said flat surface and said first side of said polygon member are in abutting relation, said second included angle of said polygon member will contact said second angular surface and cause said polygon member to rotate a first increment in a second direction opposite to said first direction of rotation until said polygon member first side is in abutting relation with said second angular surface of said cam member thereby placing said polygon member in a third oriented position, and further so that as said cam member is then translated in said second direction, said first included angle of said polygon member will contact said second side surface of said first portion and cause said polygon member to rotate a second increment in said second direction as said cam member translates further to cause said third side of said polygon member to come into abutting alignment with said flat surface so that said polygon member is in a fourth oriented position and again locked in a neutral position, (d) means remote from and connected to said cam member to cause said cam member to translate in said first and second directions.

References Cited

UNITED STATES PATENTS

| 2,779,422 | 1/1957 | Dolza et al. | 60—39.28 X |
| 2,834,182 | 5/1958 | Culbertson. | |
| 3,111,809 | 11/1963 | Bierwirth | 60—39.28 |
| 3,176,936 | 4/1965 | Howard et al. | 60—39.28 X |

AL LAWRENCE SMITH, Primary Examiner

U.S. Cl. X.R.

60—39.16